United States Patent
Wada (10) Patent No.: US 11,970,030 B2
(45) Date of Patent: *Apr. 30, 2024

(54) MULTI AIR CHAMBER TIRE

(71) Applicant: BRIDGESTONE CORPORATION, Tokyo (JP)

(72) Inventor: Shogo Wada, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 293 days.

This patent is subject to a terminal disclaimer.

(21) Appl. No.: 17/293,476

(22) PCT Filed: Sep. 10, 2019

(86) PCT No.: PCT/JP2019/035569
§ 371 (c)(1),
(2) Date: May 13, 2021

(87) PCT Pub. No.: WO2020/110420
PCT Pub. Date: Jun. 4, 2020

(65) Prior Publication Data
US 2022/0016930 A1  Jan. 20, 2022

(30) Foreign Application Priority Data
Nov. 30, 2018  (JP) .................................. 2018-225976

(51) Int. Cl.
*B60C 5/22* (2006.01)
*B60C 17/01* (2006.01)
*B60C 5/20* (2006.01)

(52) U.S. Cl.
CPC ................ *B60C 5/22* (2013.01); *B60C 17/01* (2013.01); *Y10T 152/10585* (2015.01); *Y10T 152/10612* (2015.01)

(58) Field of Classification Search
CPC .. B60C 6/22; B60C 6/20; B60C 6/025; B60C 17/01; B60C 17/02; B60C 5/22;
(Continued)

(56) References Cited

U.S. PATENT DOCUMENTS 2,563,788 A * 8/1951 Keefe ...................... B60C 5/22
 152/341.1 X
3,087,528 A 4/1963 Hindin et al.
(Continued)

FOREIGN PATENT DOCUMENTS

CN 102848862 A 1/2013
CN 203438778 U 2/2014
(Continued)

OTHER PUBLICATIONS

English machine translation of FR 2.087.349 A5, Dec. 31, 1971.*
(Continued)

*Primary Examiner* — Adrienne C. Johnstone
(74) *Attorney, Agent, or Firm* — KENJA IP LAW PC (57) ABSTRACT

A multi air chamber tire 1 includes a tread portion 4, a pair of bead portions 2, a pair of sidewall portions 3, and partition walls 30 respectively provided to half portions of a tire which are defined with respect to a tire equator plane, the partition walls 30 partitioning an inner cavity of the tire to form a plurality of air chambers disposed adjacent to each other. Each of the partition walls 30 includes a first coupling portion 9*a* and a second coupling portion 9*b* coupled with a tire inner wall surface. When the tire 1 is filled with fluid, a first air chamber 20 is formed in a space inward of the partition walls 30 in a tire width direction, and a second air chamber 21 is formed in each space between a partition wall 30 and the tire inner wall surface of a sidewall portion 3.

13 Claims, 6 Drawing Sheets (58) Field of Classification Search
CPC .. B60C 5/20; B60C 5/025; B60C 5/24; Y10T 152/10576; Y10T 152/10585; Y10T 152/10594; Y10T 152/10603; Y10T 152/10612; Y10T 152/10522
USPC ......... 152/339.1, 340.1, 341.1, 342.1, 331.1, 152/333.1, 338.1
See application file for complete search history.

(56) References Cited

U.S. PATENT DOCUMENTS

| | | | | |
|---|---|---|---|---|
| 3,095,027 | A * | 6/1963 | Weber | 152/538 X |
| 3,450,182 | A * | 6/1969 | Verdier | 152/538 X |
| 3,554,261 | A * | 1/1971 | Mirtain | B60C 9/28 |
| | | | | 152/538 X |
| 3,976,115 | A * | 8/1976 | Mirtain | 152/538 X |
| 3,982,579 | A * | 9/1976 | Mirtain | 152/538 X |
| 4,079,768 | A * | 3/1978 | Verdier | 152/538 X |
| 4,280,546 | A | 7/1981 | Mistretta | |
| 6,470,935 | B1 * | 10/2002 | Fulsang | B60C 17/01 |
| | | | | 152/339.1 |
| 2005/0279438 | A1 | 12/2005 | Onracek | |
| 2021/0339567 | A1 * | 11/2021 | Wada | B60C 5/22 |

FOREIGN PATENT DOCUMENTS

| | | | |
|---|---|---|---|
| CN | 103863023 A | | 6/2014 |
| EP | 0919405 A1 | | 6/1999 |
| EP | 1637360 A1 | | 3/2006 |
| FR | 1.534.125 A | * | 7/1968 |
| FR | 2087349 A5 | | 12/1971 |
| FR | 2276953 A1 | | 1/1976 |
| GB | 1507082 A | | 4/1978 |
| JP | 8371754 B1 | | 5/1962 |
| JP | 86176705 U | | 5/1986 |
| JP | H11334326 A | | 12/1999 |
| JP | 2002067610 A | | 3/2002 |
| JP | 2007001551 A | | 1/2007 |
| JP | 2008308125 A | | 12/2008 |
| JP | 2015077922 A | | 4/2015 |
| KR | 1020060074518 A | * | 7/2006 |
| KR | 100860218 B1 | * | 9/2008 |
| KR | 1020090077988 A | * | 7/2009 |
| KR | 1020100095299 A | * | 8/2010 |
| KR | 1020110058927 A | * | 6/2011 |
| KR | 101834926 B1 | | 3/2018 |
| TW | 436432 B | | 5/2001 |
| WO | WO-2014/057282 A1 | * | 4/2014 |
| WO | 2019115917 A1 | | 6/2019 |
| WO | WO-2020/016584 A1 | * | 1/2020 |

OTHER PUBLICATIONS

Nov. 26, 2019, International Search Report issued in the International Patent Application No. PCT/ JP2019/035569.
May 25, 2021, International Preliminary Report on Patentability issued in the International Patent Application No. PCT/ JP2019/035569.
Aug. 4, 2022, search result of the Extended European Search Report issued by the European Patent Office in the corresponding European Patent Application No. 19890147.2.
Jul. 4, 2022, search result of Office Action issued by the China National Intellectual Property Administration in the corresponding Chinese Patent Application No. 201980078633.5.

* cited by examiner

Variant of Fig. 1 wherein each second coupling portion 9b is coupled with the tire inner wall surface at a position both outward of the respective ground contact edge of the tread portion 4 in the tire width direction and inward of the respective maximum width position of the belt 6 in the tire width direction by 10% to 20% of the maximum width of the belt 6.

MULTI AIR CHAMBER TIRE

TECHNICAL FIELD

The present disclosure relates to a multi air chamber tire.

BACKGROUND

Conventionally, there are tires which allow safe travel over a certain distance even in a state where the internal pressure of the tire is reduced due to tire failure, such as a puncture. For example, PTL 1 discloses a run flat tire where side reinforcing rubber is disposed on each sidewall portion of a tire.

CITATION LIST

Patent Literature

PTL 1: Japanese Patent Laid-Open No. 11-334326

SUMMARY

Technical Problem

However, rigidity in a tire radial direction of the run flat tire having side reinforcing rubber is increased by an amount corresponding to the side reinforcing rubber added and hence, ride comfort during normal travel may be deteriorated.

The present disclosure has been made under such circumstances, and it is an object of the present disclosure to provide a multi air chamber tire which allows safe travel over a certain distance when tire failure occurs while suppressing deterioration of ride comfort.

Solution to Problem

A multi air chamber tire according to the present disclosure includes: a tread portion; a pair of bead portions; a pair of sidewall portions extending between the tread portion and the pair of bead portions; and partition walls respectively provided to half portions of a tire which are defined with respect to a tire equator plane, the partition walls partitioning an inner cavity of the tire to form a plurality of air chambers disposed adjacent to each other, wherein each of the partition walls includes a first coupling portion coupled with a tire inner wall surface, and a second coupling portion coupled with the tire inner wall surface at a position outward of the first coupling portion in a tire radial direction, and in a state where the tire is filled with fluid, a first air chamber is formed in a space located at a position inward of the partition walls in a tire width direction, and a second air chamber is formed in a space located between a partition wall of the partition walls and the tire inner wall surface of a sidewall portion of the pair of sidewall portions.

Advantageous Effect

According to the present disclosure, it is possible to provide a multi air chamber tire which allows safe travel over a certain distance when tire failure occurs while suppressing deterioration of ride comfort.

DETAILED DESCRIPTION

Hereinafter, a multi air chamber tire according to one embodiment of the present disclosure will be illustrate with reference to drawings. In the respective drawings, identical members and portions are given the same reference symbols.

Hereinafter, unless otherwise specified, assume that dimensions of respective elements, the length relationship, the positional relationship and the like are measured in the reference state where a multi air chamber tire serving as a pneumatic tire is mounted on an applicable rim, the multi air chamber tire is filled with a prescribed internal pressure, and no load is applied to the multi air chamber tire. Further, a width in the tire width direction of a contact patch which comes into contact with a road surface in a state where the tire is mounted on the applicable rim, the tire is filled with the prescribed internal pressure, and the maximum load is applied to the tire is referred to as "ground contact width of the tire", and an edge portion in the tire width direction of the ground contact width of the tire is referred to as "ground contact edge".

In this specification, "applicable rim" indicates an approved rim (Measuring Rim in STANDARDS MANUAL of ETRTO, and Design Rim in YEAR BOOK of TRA) having an applicable size which is described or which will be described in the future in the industrial standards applicable to regions where pneumatic tires are produced and used, including JATMA YEAR BOOK by JATMA (the Japan Automobile Tyre Manufacturers Association) in Japan, STANDARDS MANUAL by ETRTO (The European Tyre and Rim Technical Organisation) in Europe, and YEAR BOOK by TRA (The Tire and Rim Association, Inc.) in the United States of America. In the case of a size not described in these industrial standards, "applicable rim" indicates a rim having a width which corresponds to the bead width of a pneumatic tire. The term "applicable rim" also includes a size which may be included in the above-mentioned industrial standard in the future in addition to the current size. An example of "size which will be described in the future" includes a size described as "FUTURE DEVELOPMENTS" in ETRTO 2013.

In this specification, "prescribed internal pressure" indicates an air pressure (maximum air pressure) which corresponds to the maximum load capability of a single wheel having an applicable size and a ply rating, and which is described in the industrial standard, such as the above-mentioned JATMA YEAR BOOK. In the case of a size not described in the above-mentioned industrial standard, "prescribed internal pressure" indicates an air pressure (maximum air pressure) which corresponds to the maximum load capability specified for each vehicle on which the tire is mounted. In this specification, "maximum load" indicates a load which corresponds to the maximum load capability of a tire having an applicable size described in the above-mentioned industrial standard. In the case of a size not described in the above-mentioned industrial standard, "maximum load" indicates a load which corresponds to the maximum load capability specified for each vehicle on which the tire is mounted.

Figure 1:
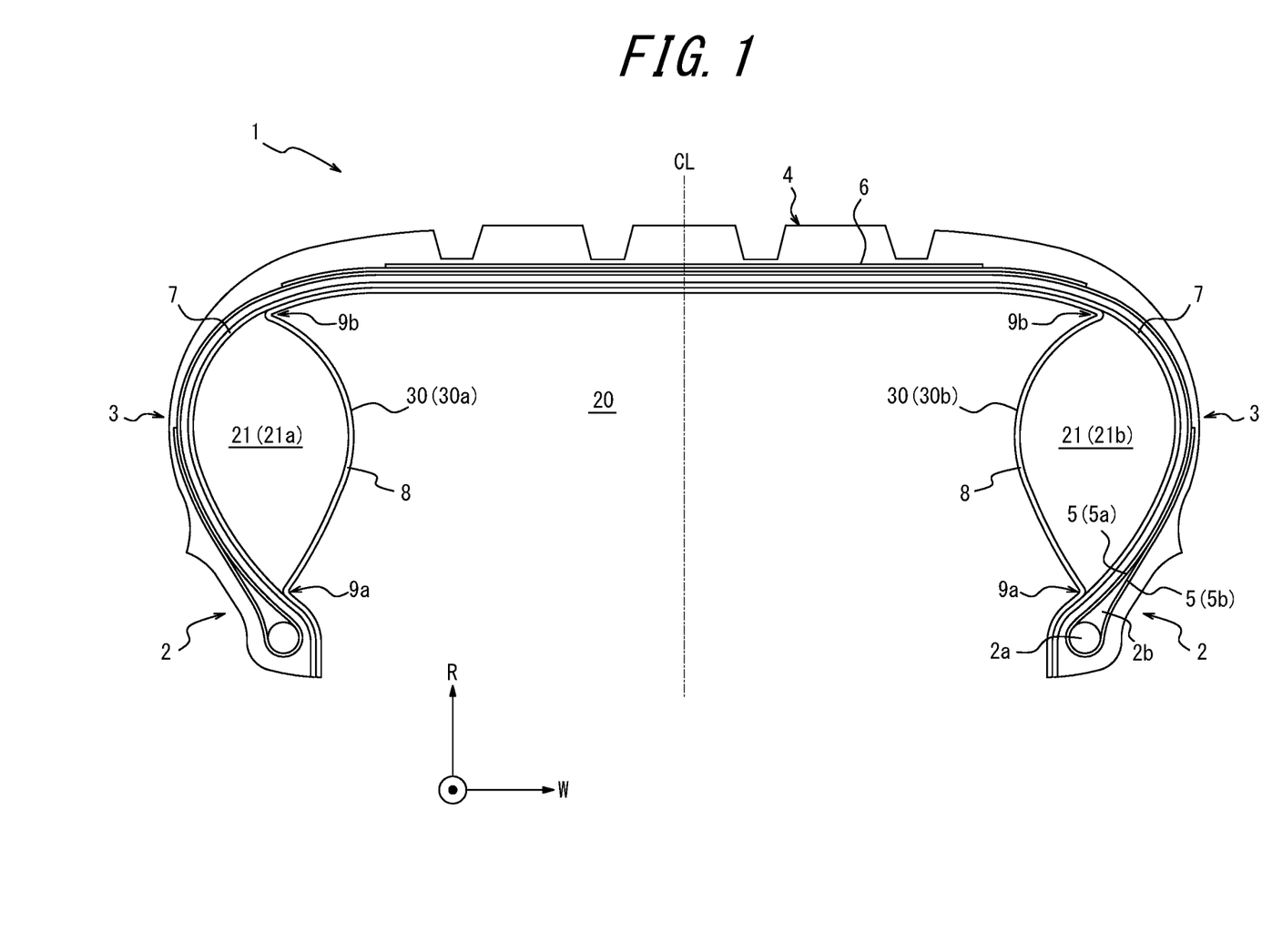
FIG. 1 is a tire width direction cross-sectional view of a multi air chamber tire according to one embodiment of the present disclosure.

FIG. 1 is a tire width direction cross-sectional view of the multi air chamber tire 1 according to one embodiment of the present disclosure (hereinafter also referred to as "tire 1") taken along the tire width direction. In FIG. 1, the tire 1 includes a pair of partition walls 30a and 30b which partitions the inner cavity of the tire into a plurality of spaces, the partition walls 30a and 30b being respectively provided to half portions of the tire which are defined with respect to a tire equator plane CL. The partition walls 30a and 30b may be film members coated with rubber, for example. However, the partition walls 30a and 30b are not limited to the above, and may be any partition walls which can prevent leakage of gas, such as air. Hereinafter, the description will be made by taking air as an example of a gas generally filled into the inner cavity of the tire. With such a configuration, when the tire 1 is mounted on the rim, and is filled with air, in the inner cavity of the tire, a first air chamber 20 is formed at a position inward of the partition walls 30a and 30b in the tire width direction, and second air chambers 21a and 21b are respectively formed at positions outward of the partition walls 30a, 30b in the tire width direction. Hereinafter, when the second air chambers 21a and 21b are not particularly distinguished from each other, the second air chambers 21a and 21b are collectively simply referred to as "second air chamber 21". When the partition walls 30a and 30b are not particularly distinguished from each other, the partition walls 30a and 30b are collectively simply referred to as "partition wall 30".

Figure 3:
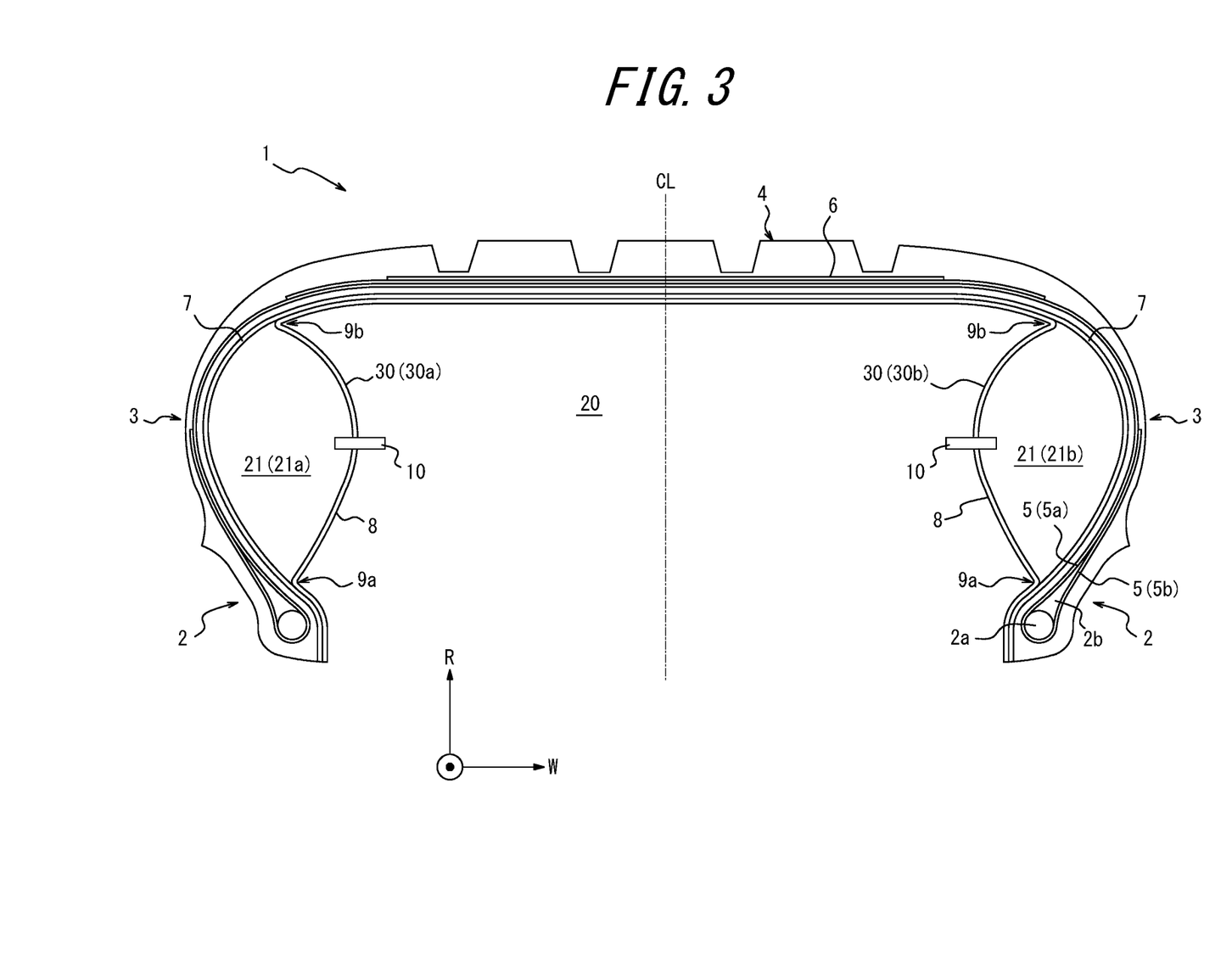
FIG. 3 is a tire width direction cross-sectional view illustrating another modification of the multi air chamber tire according to the present disclosure.

In this specification, the tire width direction indicates a direction parallel to the rotation axis of the tire 1. In FIG. 3, the tire width direction is indicated by an arrow W. Further, the tire radial direction indicates a direction orthogonal to the rotation axis of the tire 1. In FIG. 1, the tire radial direction is indicated by an arrow R. The description will be made assuming that the tire 1 has a symmetrical configuration with respect to the tire equator plane CL. However, the configuration of the tire 1 is not limited to the above. The tire 1 may have an asymmetrical configuration with respect to the tire equator plane CL.

In this specification, a direction toward the rotation axis of the tire 1 in the tire radial direction is referred to as "inward in the tire radial direction", and a direction away from the rotation axis of the tire 1 in the tire radial direction is referred to as "outward in the tire radial direction". A direction toward the tire equator plane CL in the tire width direction is referred to as "inward in the tire width direction", and a direction away from the tire equator plane CL in the tire width direction is referred to as "outward in the tire width direction".

As illustrated in FIG. 1, the tire 1 includes a pair of bead portions 2, a pair of sidewall portions 3, and a tread portion 4. Each sidewall portion 3 extends between the tread portion 4 and the bead portion 2. The sidewall portion 3 is located at a position outward of the bead portion 2 in the tire radial direction.

Each of the pair of bead portions 2 includes a bead core 2a and a bead filler 2b. The bead core 2a includes a plurality of bead wires coated with rubber around their peripheries. Each bead wire is formed of a steel cord. The steel cord may be formed of a steel monofilament or stranded wire, for example. The bead filler 2b is made of rubber or the like, and is located at a position outward of the bead core 2a in the tire radial direction. In this embodiment, the thickness of the bead filler 2b reduces toward the outward tire radial direction. The tire 1 may have a structure which includes no bead filler 2b. Each bead portion 2 is configured to be brought into contact with a rim at a position inward in the tire radial direction and outward in the tire width direction when the tire 1 is mounted on the rim.

The tire 1 includes a carcass 5. The carcass 5 extends in a toroidal shape between the pair of bead cores 2a, thus forming the skeleton of the tire. End portions of the carcass 5 engage with the bead cores 2a. Specifically, the carcass 5 includes a carcass main body portion 5a and carcass fold-back portions 5b. The carcass main body portion 5a is disposed between the bead cores 2a. Each carcass fold-back portion 5b is provided on the periphery of the bead core 2a, and is obtained by folding back the carcass 5 to extend from a position inward in the tire width direction toward a position outward in the tire width direction. A length of the carcass fold-back portion 5b from the position inward in the tire width direction toward the position outward in the tire width direction may be set to a desired length. The carcass 5 may have a structure which includes no carcass fold-back portion 5b, or may have a structure where each carcass fold-back portion 5b is wound around the bead core 2a.

The carcass 5 may be formed of one or more carcass layers. For example, the carcass 5 may be formed of two carcass layers arranged in a laminated manner in the tire radial direction in the tire equator plane CL. A carcass cord which forms the carcass layer of the carcass 5 is made of polyester, for example. However, the configuration is not limited to the above. For example, the carcass cord may be made of an organic fiber, such as nylon, rayon, or aramid, and metal, such as steel. In this embodiment, the carcass 5 has a radial structure. However, the carcass 5 is not limited to the radial structure, and may have a bias structure.

In the tread portion 4, a belt 6 and a tread rubber which reinforce the tread portion 4 are provided at positions outward of the carcass 5 in the tire radial direction. The belt 6 may be formed of a plurality of belt layers laminated in the tire radial direction, for example. A belt cord which forms the belt layer of the belt 6 is made of polyester, for example. However, the belt cord is not limited to polyester, and may be made of an organic fiber, such as nylon, rayon, or aramid, and metal, such as steel, for example.

The tire 1 includes an inner liner 7. The inner liner 7 is disposed such that the inner liner 7 covers the inner wall surface of the tire 1. The inner liner 7 may be formed of a plurality of inner liner layers laminated in the tire radial direction in the tire equator plane CL. The inner liner 7 is made of butyl-based rubber having low air permeability, for example. The butyl-based rubber includes butyl rubber, and halogenated butyl rubber, which is a derivative of butyl rubber, for example. The inner liner 7 is not limited to butyl-based rubber, and may be made of other rubber composition, a resin, or elastomer.

The tire 1 includes a reinforcement layer 8. The reinforcement layer 8 is disposed such that the reinforcement layer 8 covers the inner wall surface of the tire 1 at a position inward of the inner liner 7 and the inner wall surface of the tire. The reinforcement layer 8 is a film member coated with rubber, for example. The reinforcement layer 8 may be any member, such as a film, which has low permeability of gas, such as air. With such a configuration, at least a portion of the reinforcement layer 8 serves as the partition wall 30 which forms the air chamber. The reinforcement layer 8 is coupled with the inner liner 7 at first coupling portions 9a and second coupling portions 9b, but is separated from the inner liner 7 between each first coupling portion 9a and each second coupling portion 9b. In this embodiment, two first coupling portions 9a are provided at positions symmetrical with respect to the tire equator plane CL. Two second coupling portions 9b are provided at positions symmetrical with respect to the tire equator plane CL. The first coupling portion 9a and the second coupling portion 9b are provided at positions different in the tire radial direction. The second coupling portion 9b is located at a position outward of the first coupling portion 9a in the tire radial direction.

In this embodiment, when the tire 1 is filled with air, in the inner cavity of the tire, air chambers are formed in spaces surrounded by the inner liner 7 and the reinforcement layer 8 and in a space located at a position inward of the reinforcement layer 8 in the tire width direction, an internal pressure being applied to the air chambers. Therefore, in this embodiment, portions of the reinforcement layer 8 each of which is located between the first coupling portion 9a and the second coupling portion 9b respectively serve as the above-mentioned partition walls 30a and 30b. That is, the pair of partition walls 30a and 30b are respectively located in the half portions of the tire, and are coupled with a tire inner wall surface at the first coupling portions 9a and the second coupling portions 9b. Here, the state where the tire 1 is filled with air indicates a state where the tire 1 is mounted on the applicable rim, and is filled with a predetermined internal pressure. For example, the state where the tire 1 is filled with air includes the above-mentioned reference state. The air chamber formed in a space located at a position inward of the reinforcement layer 8 in the tire width direction is referred to as "first air chamber 20" The air chambers formed in spaces each of which is surrounded by the reinforcement layer 8 and the tire inner wall surface of the sidewall portion 3 are referred to as "second air chambers 21a and 21b". FIG. 1 illustrates one first air chamber 20 and two second air chambers 21a and 21b formed in the tire 1.

Each of the two second air chambers 21a and 21b is formed in one space continuous in the tire circumferential direction. However, the configuration is not limited to the above. For example, each of the two second air chambers 21a and 21b may be formed of a plurality of small air chambers formed by dividing a space in the tire circumferential direction by partition walls or the like provided to extend in a direction intersecting with the tire circumferential direction.

The reinforcement layer 8 may be formed on the inner wall surface of the tire 1 by a desired method. For example, at the time of forming the reinforcement layer 8, the inner liner 7 and the reinforcement layer 8 may be caused to overlap and adhere with each other in the tire width direction in a state where the reinforcement layer 8 can be released in each region between the first coupling portion 9a and the second coupling portion 9b. For example, when a release agent, such as silicone oil, is applied to release regions each of which is located between the first coupling portion 9a and the second coupling portion 9b on the surface of the reinforcement layer 8 located outward in the tire width direction, the inner liner 7 and the reinforcement layer 8 may be caused to adhere with each other in a state where at least a portion of the reinforcement layer 8 can be released. Alternatively, when molding is performed in a state where a release member is sandwiched in each release region between the inner liner 7 and the reinforcement layer 8, a releasing operation can be easily performed, and the inner liner 7 and the reinforcement layer 8 may be caused to adhere with each other in a state where at least a portion of the reinforcement layer 8 can be released. The release member may be, for example, a knitted member, a woven fabric member, or a cotton member which has stretchability and fine mesh which prevents permeation of rubber during vulcanization, a member obtained by overlapping a plurality of these members, or a resin film. With the use of such a forming method, the tire 1 can be manufactured with a simpler manufacturing method and hence, it is possible to prevent an increase in manufacturing costs.

The description has been made for an example where each partition wall 30 is formed such that at least a portion of the reinforcement layer 8 is released from the inner liner 7. However, the configuration of the partition wall 30 or the method for forming the partition wall 30 is not limited to the above. For example, the partition wall 30 may be formed such that the first coupling portion 9a and the second coupling portion 9b of a suitable sheet-like member having low permeability of gas, such as air, are caused to adhere to the tire inner wall surface. Alternatively, the partition wall 30 may be formed such that portions of an outer surface of a suitable hollow ring-like member having low permeability of gas, such as air, are caused to adhere to the tire inner wall surface by using the first coupling portion 9a and the second coupling portion 9b as end portions.

In this embodiment, at least a portion of another member included in the tire 1 may be used as the reinforcement layer 8 which forms the partition walls 30. For example, the reinforcement layer 8 may be a carcass layer which forms a portion of the above-mentioned carcass 5. In such a case, the carcass layer forming the reinforcement layer 8 is coupled with another carcass layer at the first coupling portions 9a and the second coupling portions 9b, but is separated from the other carcass layer in each range between the first coupling portion 9a and the second coupling portion 9b. With such a configuration, the carcass layer can serve as partition walls which form the air chambers. The reinforcement layer 8 may also be an inner liner layer which forms a portion of the above-mentioned inner liner 7. In such a case, the inner liner layer forming the reinforcement layer 8 is coupled with another inner liner layer at the first coupling portion 9a and the second coupling portion 9b, but is separated from another inner liner layer in each range between the first coupling portion 9a and the second coupling portion 9b. With such a configuration, the inner liner layer can serve as partition walls which form the air chambers.

The partition wall 30 has strength which prevents expansion and deformation in a state where the second air chamber 21 which faces the partition wall 30 is filled with the predetermined internal pressure. For example, the strength of the partition wall 30 may be set to strength which prevents expansion and deformation of the partition wall 30 caused by the internal pressures of the second air chambers 21a and 21b when the second air chambers 21a and 21b are filled with the prescribed internal pressure in a state where the first air chamber 20 is not filled with air. For example, the strength of the partition wall 30 may be set to strength which allows the second air chambers 21a and 21b to support the maximum load or a certain load of less than the maximum load without causing expansion or deformation when the second air chambers 21a and 21b are filled with the predetermined internal pressure in the state where the first air chamber 20 is not filled with air. To increase strength of the partition wall 30, the partition wall 30 may be, for example, a member which constrains expansion and deformation, such as a member formed by covering an organic fiber, a glass fiber, a steel cord or the like by rubber composition or a resin, or a member made of rubber composition having high hardness.

The first coupling portions 9a and the second coupling portions 9b of the partition walls 30 can be coupled with the tire inner wall surface at positions where the second air chambers 21a and 21b can support the maximum load or a certain load of less than the maximum load when the second air chambers 21a and 21b are filled with the predetermined internal pressure in a state where the first air chamber 20 is not filled with air. For example, each first coupling portion 9a may be coupled with the tire inner wall surface at a position outward of the bead core 2a of the bead portion 2 in the tire radial direction. For example, each first coupling portion 9a may be coupled with the tire inner wall surface at a position outward of the bead core 2a of the bead portion 2 in the tire radial direction. Further, for example, each second coupling portion 9b may be coupled with the tire inner wall surface at a position outward of the ground contact edge of the tread portion 4 in the tire width direction. However, the second coupling portion 9b may also be coupled with the tire inner wall surface at a position inward of the ground contact edge of the tread portion 4 in the tire width direction.

Figure 6:
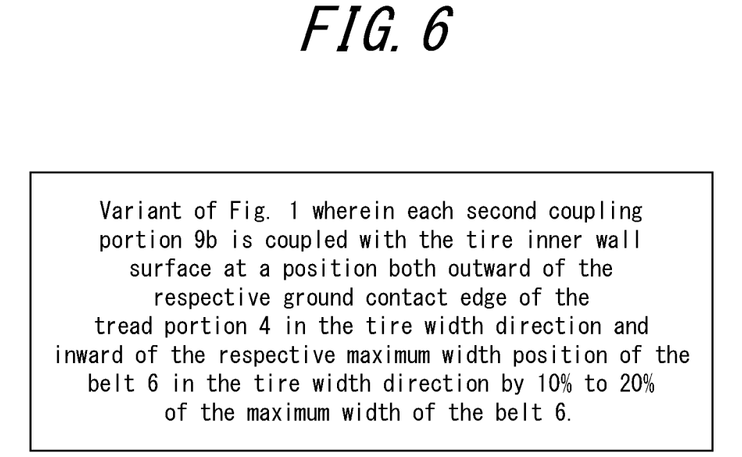
FIG. 6 is a variant of FIG. 1 wherein each second coupling portion 9b is coupled with the tire inner wall surface at a position both outward of the respective ground contact edge of the tread portion 4 in the tire width direction and inward of the respective maximum width position of the belt 6 in the tire width direction by 10% to 20% of the maximum width of the belt 6.

In FIG. 1, each second coupling portion 9b is coupled with the tire inner wall surface at a position outward of the maximum width position of the belt 6 in the tire width direction. As shown in FIG. 6, the second coupling portion 9b may be coupled with the tire inner wall surface at a position inward of the maximum width position of the belt 6 in the tire width direction, preferably at a position inwardly separated from the maximum width position of the belt 6 in the tire width direction by 10 to 20% of the maximum width of the belt. Such a configuration allows a load applied to the second air chambers 21a and 21b to be supported by the belt 6 when air is leaking from the air chamber 20b due to tire failure and hence, supporting capacity during tire failure can be further improved.

Figure 2:
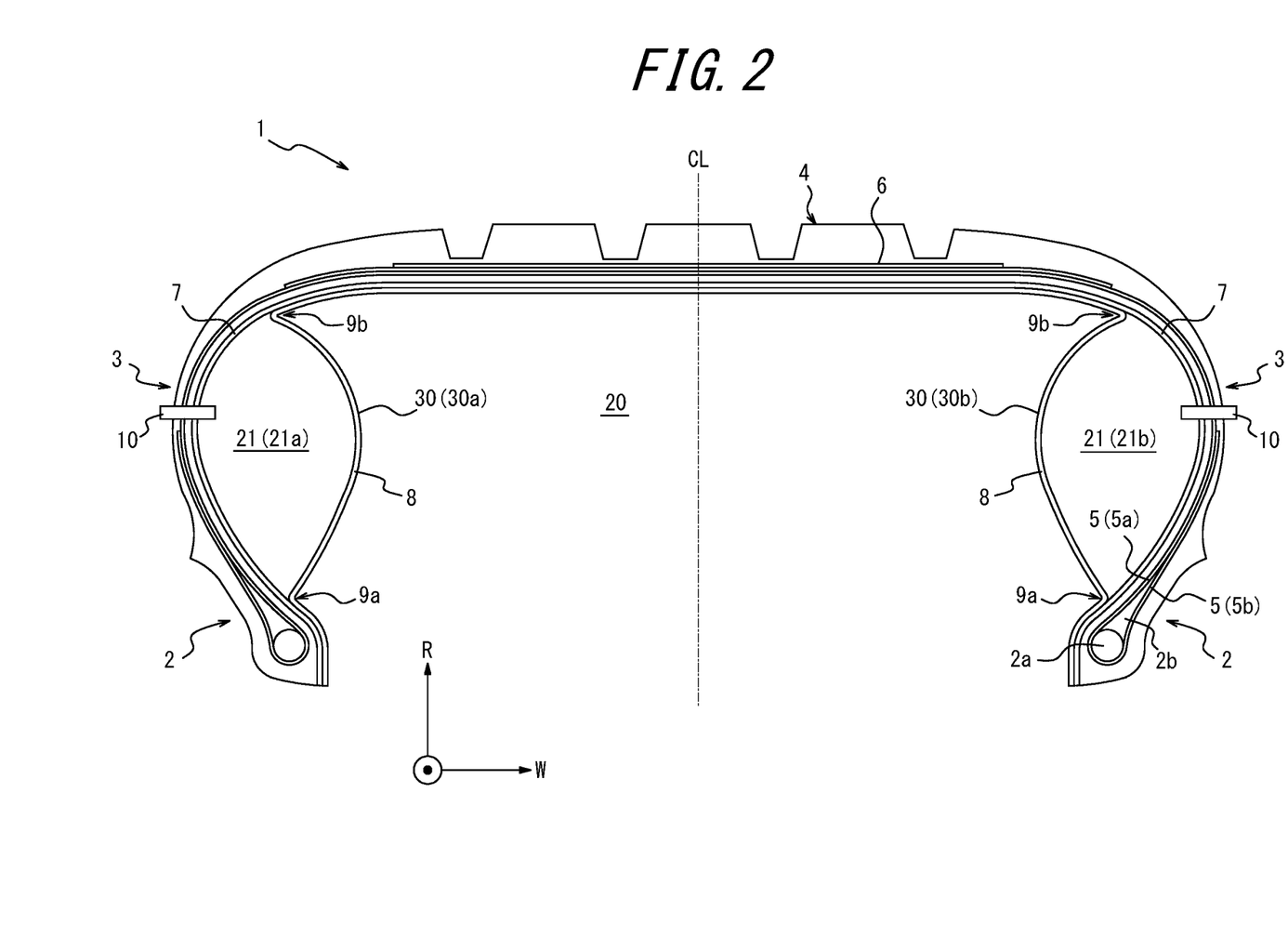
FIG. 2 is a tire width direction cross-sectional view illustrating a modification of the multi air chamber tire according to the present disclosure.

Next, a modification of the multi air chamber tire 1 according to the present disclosure will be described with reference to drawings. FIG. 2 and FIG. 3 are tire width direction cross-sectional views illustrating modifications of the multi air chamber tire 1. Each of the tires 1 of these modification further includes ventilation members 10 which allow ventilation to the second air chambers 21. The ventilation member 10 may be a valve, for example. However, the ventilation member 10 is not limited to a valve, and may be any device, such as a mechanical valve or a solenoid valve, which allows ventilation to the second air chamber 21. Each ventilation member 10 may be disposed at any position on the tire 1. For example, as illustrated in FIG. 2, the ventilation member 10 may be disposed at a position where the ventilation member 10 penetrates through the inner liner 7 and the sidewall portion 3. With such a configuration, the ventilation member 10 connect the second air chamber 21 and the outside of the tire 1 in a state where ventilation is allowed. Further, as illustrated in FIG. 3, the ventilation member 10 may be disposed at a position between the first coupling portion 9a and the second coupling portion 9b, where the ventilation member 10 penetrates through the partition wall 30 (the reinforcement layer 8). In such a case, the ventilation member 10 connects the first air chamber 20 and the second air chamber 21 in a state where ventilation is allowed. In FIG. 2 and FIG. 3, one ventilation member 10 is disposed for each of the second air chambers 21a and 21b. However, the number of ventilation members 10 is not limited to the above. The desired number of ventilation members 10 may be disposed on the tire 1 according to the application of the tire 1.

The ventilation member 10 may be a ventilation member which allows ventilation in both directions, that is, in the filling direction to the second air chamber 21 and in the discharging direction from the second air chamber 21. Alternatively, the ventilation member 10 may be a ventilation member which allows one of ventilation in the filling direction to the second air chamber 21 or ventilation in the discharging direction from the second air chamber 21. For example, the ventilation member 10 may be a ventilation member which cannot prevent ventilation in the filling direction to the second air chamber 21, but can prevent ventilation in the discharging direction from the second air chamber 21. Alternatively, the ventilation member 10 may be a ventilation member which can prevent ventilation in the filling direction to the second air chamber 21, but cannot prevent ventilation in the discharging direction from the second air chamber 21. In such a case, the ventilation member 10 may be a check valve which can regulate ventilation in a fixed direction, or a valve including the check valve, for example.

Next, one example of a deformed mode of the multi air chamber tire 1 according to the present disclosure at the time of a puncture will be described with reference to drawings. In normal conditions, each of the first air chamber 20 and the two second air chambers 21a and 21b of the tire 1 is filled with air to have a prescribed internal pressure.

Figure 4:
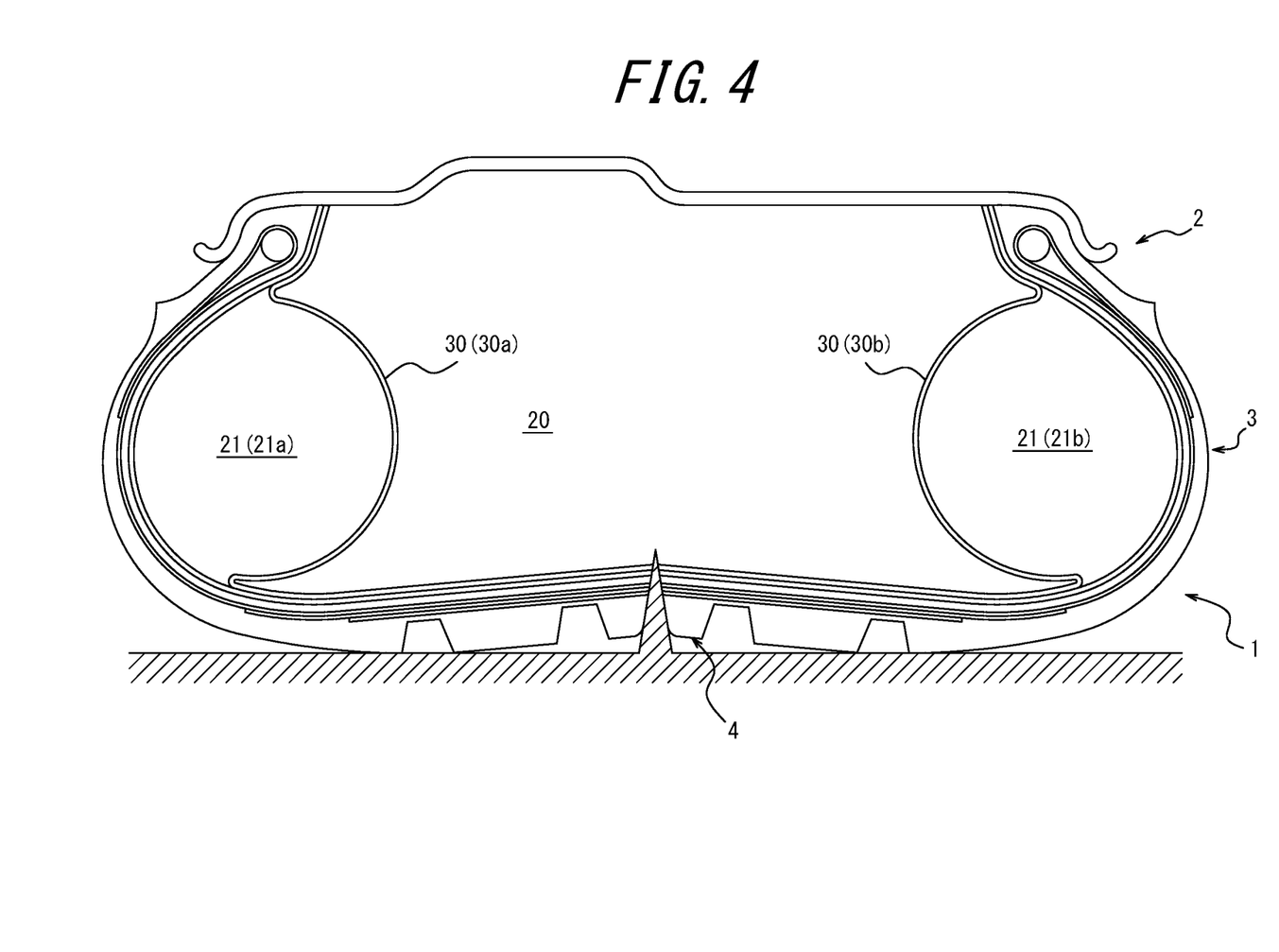
FIG. 4 is a tire width direction cross-sectional view schematically illustrating one example of a deformed mode of the multi air chamber tire illustrated in FIG. 1 at the time of a puncture.

FIG. 4 is a tire width direction cross-sectional view schematically illustrating a state where a puncture occurs in the tread portion 4 of the tire 1 illustrated in FIG. 1. When a puncture or the like occurs in the tread portion 4, air in the first air chamber 20 leaks to the outside of the tire from the damaged portion where the puncture or the like occurs. At this point, the two second air chambers 21a and 21b are respectively defined by the partition walls 30a and 30b, thus being separated from the first air chamber 20 and hence, air does not leak to the outside of the tire from the second air chambers 21a and 21b. Therefore, the second air chambers 21a and 21b support a vehicle body, thus allowing travel after a puncture occurs. That is, the second air chambers 21a and 21b play a role substantially equivalent to the role of the side reinforcing rubber disposed on each sidewall portion of a conventional run flat tire, for example.

Figure 5:
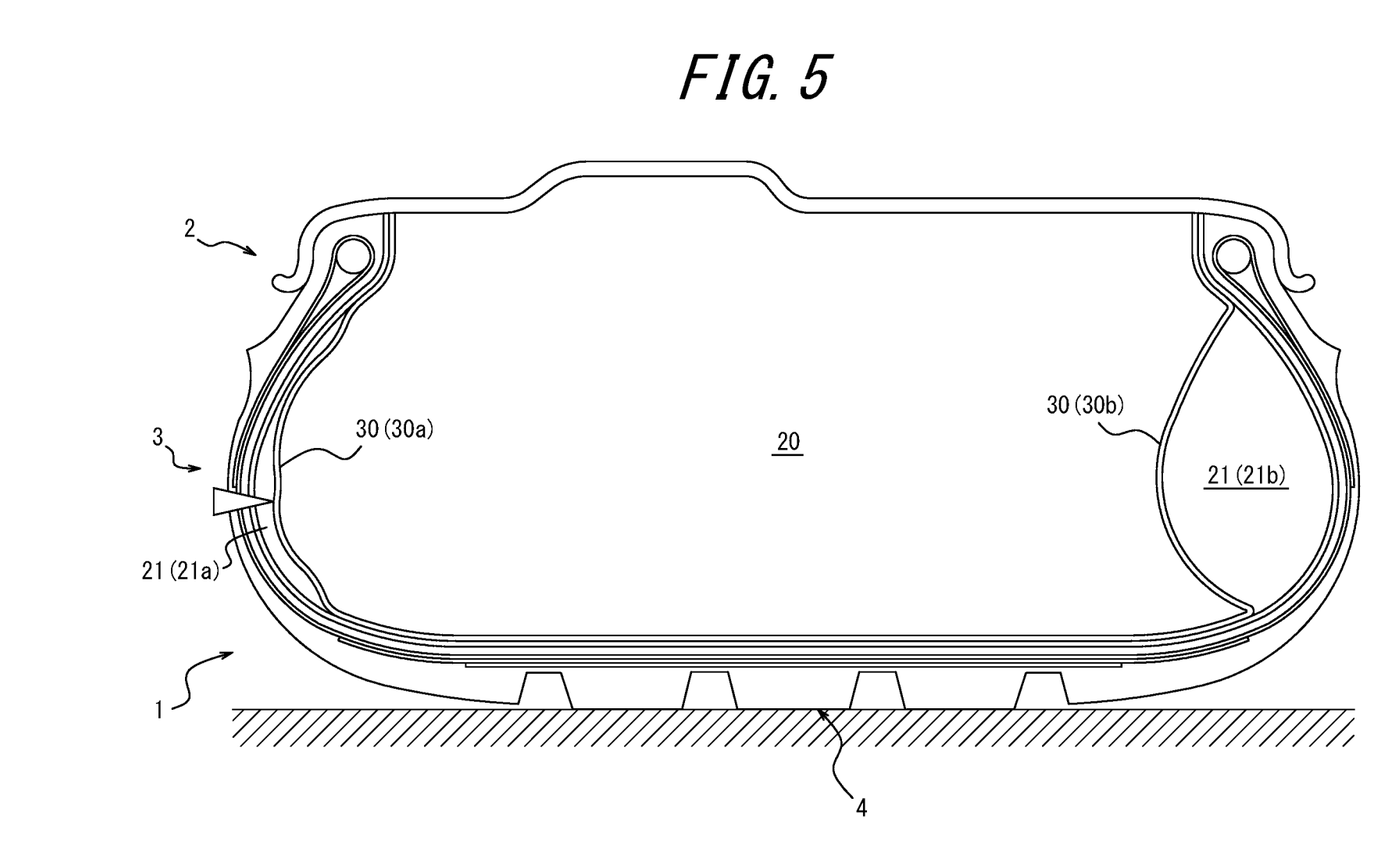
FIG. 5 is a tire width direction cross-sectional view schematically illustrating another example of the deformed mode of the multi air chamber tire illustrated in FIG. 1 at the time of a puncture.

FIG. 5 is a tire width direction cross-sectional view schematically illustrating a state where a puncture occurs in the sidewall portion 3 of the half portion of the tire which the second air chamber 21a of the tire 1 illustrated in FIG. 1 faces. When a puncture or the like occurs in the sidewall portion 3, air in the second air chamber 21a leaks to the outside of the tire from the damaged portion where the puncture or the like occurs. At this point, the first air chamber 20 and the second air chamber 21b are defined by the partition wall 30a, thus being separated from the second air chamber 21a and hence, air does not leak to the outside of the tire from the first air chamber 20 and the second air chamber 21b. Therefore, the first air chamber 20 and the second air chamber 21b support a vehicle body, thus allowing travel after a puncture occurs. At this point, air in the second air chamber 21a leaks to the outside of the tire and hence, the internal pressure of the second air chamber 21a reduces to a level lower than the internal pressure of the first air chamber 20 whereby the partition wall 30a is brought into close contact with the tire inner wall surface. The partition wall 30a is brought into close contact with the tire inner wall surface and hence, the amount of leakage of air from the damaged portion is also reduced.

As has been described above, the multi air chamber tire 1 according to the present disclosure includes the tread portion 4, the pair of bead portions 2, the pair of sidewall portions 3 extending between the tread portion 4 and the pair of the bead portions 2, and the partition walls 30 respectively provided to the half portions of the tire which are defined with respect to the tire equator plane CL, the partition walls 30 partitioning the inner cavity of the tire to form the plurality of air chambers disposed adjacent to each other. Each of the partition walls 30 includes the first coupling portion 9a coupled with the tire inner wall surface, and the second coupling portion 9b coupled with the tire inner wall surface at a position outward of the first coupling portion 9a in the tire radial direction. In a state where the tire 1 is filled with fluid, the first air chamber 20 is formed in a space located at a position inward of two partition walls 30 in the tire width direction, and the second air chambers 21 are formed in spaces located between the two partition walls 30 and the tire inner wall surface of the sidewall portions 3. Such a configuration can reduce an influence on ride comfort during normal travel, such as an increase in rigidity in the tire radial direction compared with the conventional run flat tire where the sidewall portions 3 have side reinforcing rubber. Further, the tire 1 has the plurality of air chambers in the inside thereof and hence, the tire 1 allows continuous travel even when failure occurs in any one of the plurality of air chambers. With such a configuration, it is possible to allow safe travel over a certain distance when tire failure occurs while suppressing deterioration of ride comfort. Further, such a configuration can suppress an increase in weight of the tire 1 compared with the conventional run flat tire where side reinforcing rubber is added to each sidewall portion 3 and hence, deterioration of fuel efficiency can be reduced during travel.

In the multi air chamber tire 1 according to the present disclosure, it is preferable that each of the partition walls 30 be a member which constrains expansion and deformation. Such a configuration allows the shapes, volumes and the like of the first air chamber 20 and the second air chambers 21 of the multi air chamber tire 1 to be easily maintained.

In the multi air chamber tire 1 according to the present disclosure, it is preferable that the bead portion 2 include the bead core 2a, and the first coupling portion 9a is coupled with the tire inner wall surface at a position outward of the bead core 2a in the tire radial direction. Such a configuration allows a load of a vehicle applied to outward portions in the tire radial direction via the rim to be appropriately supported by the second air chambers 21 even when a puncture or the like occurs in the tread portion 4. Further, the shape of a portion of the multi air chamber tire 1 which is located at a position inward of the first coupling portion 9a of in the tire radial direction, and which is mounted on the rim may be set to be identical to the shape of a corresponding portion of a general tire. With such a configuration, the multi air chamber tire 1 can be mounted on an applicable rim described later without preparing a special rim and hence, convenience of the multi air chamber tire 1 is improved.

In the multi air chamber tire 1 according to the present disclosure, it is preferable that the second coupling portion 9b be coupled with the tire inner wall surface at a position outward of the ground contact edge of the tread portion 4 in the tire width direction. Such a configuration can prevent, during travel in a state where the multi air chamber tire 1 mounted, air from easily leaking from the second air chamber 21 even in a case where a puncture or the like occurs in the contact patch of the tread portion 4, which has high probability of occurrence of a puncture or the like. Accordingly, such a configuration is more effective.

It is preferable that the multi air chamber tire 1 according to the present disclosure further include the ventilation member 10 configured to allow ventilation to the second air chamber 21. Such a configuration allows air to be filled into the second air chamber 21 through the ventilation member 10 when the internal pressure of the second air chamber 21 reduces without replacing the multi air chamber tire 1 and hence, the multi air chamber tire 1 can be repeatedly utilized whereby convenience of the multi air chamber tire is improved.

In the multi air chamber tire 1 according to the present disclosure, it is preferable that the ventilation member 10 be disposed at a position where the ventilation member 10 penetrates through the sidewall portion 3. Such a configuration allows air to be repeatedly filled into the second air chamber 21 directly through the ventilation member 10 even in a state where the multi air chamber tire 1 is mounted on the rim, for example, and hence, convenience of the multi air chamber tire is improved.

In the multi air chamber tire 1 according to the present disclosure, it is preferable that the ventilation member 10 be disposed at a position where the ventilation member 10 penetrates through the partition wall 30. Such a configuration allows air to be filled into the first air chamber 20 via a valve or the like provided to the rim in a state where the multi air chamber tire 1 is mounted on the rim and hence, air can also be filled into the second air chamber 21 via the ventilation member 10 whereby convenience of the multi air chamber tire is improved.

The present disclosure has been described based on the drawings and the embodiments. However, note that various variations and modifications may be easily made by those who are skilled in the art based on the present disclosure. Accordingly, it is noted that these variations and modifications are included in the scope of the present disclosure. For example, components or functions included in the respective embodiments may be rearranged in a logically consistent manner. Further, the components or the functions included in the respective embodiments may be used in combination with another embodiment. The plurality of components or functions may be combined into one component or function, may be divided, or may be partially omitted.

For example, in the present disclosure, the description has been made assuming that one second air chamber 21 is provided on the inner wall surface side of each of the pair of sidewall portions 3. However, the configuration is not limited to the above. For example, two or more second air chambers 21 may be provided to each sidewall portion 3.

Further, for example, in the present disclosure, the description has been made assuming that the tire 1 has the symmetrical configuration with respect to the tire equator plane CL. However, the configuration of the tire 1 is not limited to the above. For example, two second air chambers 21 may differ in at least one of volume and shape, the two second air chambers 21 being respectively provided on the inner wall surface side of the pair of sidewall portions 3

Further, for example, in the present disclosure, the description has been made assuming that the tire 1 is filled with air. However, the configuration is not limited to the above. For example, the tire 1, that is, the air chamber of the tire 1 may be filled with a gas, such as nitrogen. Further, for example, a material filled into the tire 1, that is, the air chamber of the tire 1 is not limited to a gas, and fluid, such as liquid, a gel-like substance, or a granular material may be filled into the tire 1, that is, the air chamber of the tire 1.

Further, for example, in the present disclosure, the tire 1 may be configured to further include a sensor which measures the internal pressure of at least one of the first air chamber 20 and the second air chambers 21, and a control device for controlling the ventilation member 10. In such a case, the control device installed inside or outside the tire 1 can control ventilation through the ventilation member 10 when the occurrence of a puncture is determined based on the internal pressure measured by the sensor.

Further, for example, in the present disclosure, the description has been made assuming that two second air chambers 21 are formed in the inner cavity of the tire 1. However, the configuration is not limited to the above. For example, the number of second air chambers 21 formed in the tire 1 may be set to a desired number of two or more according to the application of the tire 1.

REFERENCE SIGNS LIST

1 multi air chamber tire
2 bead portion
2a bead core
2b bead filler
3 sidewall portion
4 tread portion
5 carcass
5a carcass main body portion
5b carcass fold-back portion
6 belt
7 inner liner
8 reinforcement layer
9a first coupling portion
9b second coupling portion
10 (10a, 10b) ventilation member
20 first air chamber
21 (21a, 21b) second air chamber
30 (30a, 30b) partition wall

The invention claimed is:

1. A multi air chamber tire comprising:
a tread portion;
a pair of bead portions;
a pair of sidewall portions extending between the tread portion and the pair of bead portions; and
partition walls respectively provided to half portions of a tire which are defined with respect to a tire equator plane, the partition walls partitioning an inner cavity of the tire to form a plurality of air chambers disposed adjacent to each other, wherein
each of the partition walls includes a first coupling portion coupled with a tire inner wall surface, and a second coupling portion coupled with the tire inner wall surface at a position outward of the first coupling portion in a tire radial direction,
in a state where the tire is filled with fluid, a first air chamber is formed in a space located at a position inward of the partition walls in a tire width direction, and a second air chamber is formed in each space located between a partition wall of the partition walls and the tire inner wall surface of a sidewall portion of the pair of sidewall portions, and
in each partition wall, the second coupling portion is coupled with the tire inner wall surface at a position outward of a respective ground contact edge of the tread portion in the tire width direction and inward of a respective maximum width position of a belt provided in the tread portion in the tire width direction by 10% to 20% of a maximum width of the belt.

2. The multi air chamber tire according to claim 1, wherein
each of the partition walls is a member which constrains expansion and deformation.

3. The multi air chamber tire according to claim 1, wherein
each of the pair of bead portions includes a bead core, and
in each partition wall, the first coupling portion is coupled with the tire inner wall surface at a position outward of the respective bead core in the tire radial direction.

4. The multi air chamber tire according to claim 1, further comprising, in each second air chamber, a ventilation member configured to allow ventilation to the second air chamber.

5. The multi air chamber tire according to claim 4, wherein
in each second air chamber, the ventilation member is disposed at a position where the ventilation member penetrates through the sidewall portion of the pair of sidewall portions.

6. The multi air chamber tire according to claim 4, wherein in each second air chamber, the ventilation member is disposed at a position where the ventilation member penetrates through the partition wall of the partition walls.

7. The multi air chamber tire according to claim 4, further comprising in each second air chamber a second ventilation member configured to allow ventilation to the second air chamber, wherein in each second air chamber, the ventilation member is disposed at a position where the ventilation member penetrates through the sidewall portion of the pair of sidewall portions, and in each second air chamber, the second ventilation member is disposed at a position where the ventilation member penetrates through the partition wall of the partition walls.

8. The multi air chamber tire according to claim 1, wherein
each of the partition walls is a member which constrains expansion and deformation,
each of the pair of bead portions includes a bead core, and
in each partition wall, the first coupling portion is coupled with the tire inner wall surface at a position outward of the respective bead core in the tire radial direction.

9. The multi air chamber tire according to claim 1, further comprising, in each second air chamber, a ventilation member configured to allow ventilation to the second air chamber, wherein
each of the partition walls is a member which constrains expansion and deformation.

10. The multi air chamber tire according to claim 1, further comprising, in each second air chamber, a ventilation member configured to allow ventilation to the second air chamber, wherein
   each of the pair of bead portions includes a bead core, and
   in each partition wall, the first coupling portion is coupled with the tire inner wall surface at a position outward of the respective bead core in the tire radial direction.

11. The multi air chamber tire according to claim 1, further comprising, in each second air chamber, a ventilation member configured to allow ventilation to the second air chamber, wherein
   each of the partition walls is a member which constrains expansion and deformation,
   each of the pair of bead portions includes a bead core, and
   in each partition wall, the first coupling portion is coupled with the tire inner wall surface at a position outward of the respective bead core in the tire radial direction.

12. The multi air chamber tire according to claim 1, further comprising, in each second air chamber, a ventilation member configured to allow ventilation to the second air chamber and a second ventilation member configured to allow ventilation to the second air chamber, wherein
   each of the partition walls is a member which constrains expansion and deformation,
   in each second air chamber, the ventilation member is disposed at a position where the ventilation member penetrates through the sidewall portion of the pair of sidewall portions, and
   in each second air chamber, the second ventilation member is disposed at a position where the ventilation member penetrates through the partition wall of the partition walls.

13. The multi air chamber tire according to claim 1, further comprising, in each second air chamber, a ventilation member configured to allow ventilation to the second air chamber and a second ventilation member configured to allow ventilation to the second air chamber, wherein
   each of the pair of bead portions includes a bead core,
   in each partition wall, the first coupling portion is coupled with the tire inner wall surface at a position outward of the respective bead core in the tire radial direction,
   in each second air chamber, the ventilation member is disposed at a position where the ventilation member penetrates through the sidewall portion of the pair of sidewall portions, and
   in each second air chamber, the second ventilation member is disposed at a position where the ventilation member penetrates through the partition wall of the partition walls.

* * * * *